US008874296B2

(12) United States Patent
Chun et al.

(10) Patent No.: US 8,874,296 B2
(45) Date of Patent: Oct. 28, 2014

(54) ELECTRIC BICYCLE AND CONTROL METHOD THEREOF

(71) Applicant: Mando Corporation, Pyeongtaek-si (KR)

(72) Inventors: Jae Hyung Chun, Yongin-si (KR); In Ha Paick, Seoul (KR)

(73) Assignee: Mando Corporation, Pyeongtaek-Si (KR)

( * ) Notice: Subject to any disclaimer, the term of this patent is extended or adjusted under 35 U.S.C. 154(b) by 0 days.

(21) Appl. No.: 13/682,653

(22) Filed: Nov. 20, 2012

(65) Prior Publication Data

US 2014/0081496 A1 Mar. 20, 2014

(30) Foreign Application Priority Data

Sep. 19, 2012 (KR) ........................ 10-2012-0104231

(51) Int. Cl.
*B60L 15/10* (2006.01)
*B60L 11/00* (2006.01)
*B62M 6/45* (2010.01)

(52) U.S. Cl.
CPC . *B60L 11/00* (2013.01); *B62M 6/45* (2013.01)
USPC .......................................................... 701/22

(58) Field of Classification Search
CPC . B60W 10/08; B60W 10/04; B60W 20/1088; B60W 20/102
USPC .......................................................... 701/22
See application file for complete search history.

(56) References Cited

U.S. PATENT DOCUMENTS

| | | | | |
|---|---|---|---|---|
| 5,664,636 | A | 9/1997 | Ikuma et al. | |
| 2010/0131164 | A1* | 5/2010 | Carter et al. | 701/61 |
| 2012/0202649 | A1* | 8/2012 | Huber | 482/2 |

FOREIGN PATENT DOCUMENTS

| | | | |
|---|---|---|---|
| DE | 19732430 | A1 | 2/1999 |
| JP | 2002-264882 | A | 9/2002 |
| JP | 2007101219 | A | 4/2007 |
| JP | 2007-161219 | A | 6/2007 |
| WO | 2011/081359 | A2 | 7/2011 |

OTHER PUBLICATIONS

Extended European Search Report issued in European Patent Application No. EP 12190269.6 dated Dec. 17, 2013.

* cited by examiner

*Primary Examiner* — James Trammell
*Assistant Examiner* — Michael D Lang
(74) *Attorney, Agent, or Firm* — McDermott Will & Emery LLP

(57) ABSTRACT

An electric bicycle and a control method thereof are disclosed. The disclosed control method, which drives the electric bicycle by rotating a motor using electrical energy accumulated in a battery, includes receiving an acceleration command value input by a user to accelerate the electric bicycle upon starting the electric bicycle from a stopped state, comparing the input acceleration command value with a reference value, and increasing a time taken for a rotation speed of the motor to reach a target speed when the input acceleration command value is greater than the reference value.

5 Claims, 5 Drawing Sheets

40
Acceleration Command Value
41
COMPARATOR
Reference Value
42
SUDDEN START DETERMINER
SUDDEN START PREVENTER
Motor Control Signal
43

ELECTRIC BICYCLE AND CONTROL METHOD THEREOF

CROSS-REFERENCE TO RELATED APPLICATIONS

This application claims the benefit of Korean Patent Application No. P2012-104231, filed on Sep. 19, 2012 in the Korean Intellectual Property Office, the disclosure of which is incorporated herein by reference.

BACKGROUND

1. Field

Embodiments of the present invention relate to an electric bicycle and a control method thereof, which are capable of preventing sudden start.

2. Description of the Related Art

Generally, electric bicycles include a motor to rotate wheels and a battery to supply electric power to the motor. Such an electric bicycle travels in accordance with rotation of the wheels by the motor.

In such an electric bicycle, when the user rotates an acceleration means disposed on a handle, namely, a throttle, to rotate the motor, the wheels are rotated in accordance with rotation of the motor, thereby causing the bicycle to travel forward.

Upon starting the electric bicycle through operation of the throttle, sudden start may occur. That is, the electric bicycle may start suddenly and very quickly.

Such sudden start may degrade ride sensation. To this end, a safety measure to prevent sudden start has recently been required.

SUMMARY

Therefore, it is an aspect of the present invention to provide an electric bicycle and a control method thereof, which are capable of preventing sudden start from occurring when the electric bicycle starts from a stopped state.

Additional aspects of the invention will be set forth in part in the description which follows and, in part, will be obvious from the description, or may be learned by practice of the invention.

In accordance with one aspect of the present invention, a control method of an electric bicycle for driving the electric bicycle by rotating a motor using electrical energy accumulated in a battery includes receiving an acceleration command value input by a user to accelerate the electric bicycle upon starting the electric bicycle from a stopped state, comparing the input acceleration command value with a reference value, and varying a speed gradient of the motor such that the speed gradient is gentler than a target speed gradient when the input acceleration command value is greater than the reference value.

The input acceleration command value may be determined based on a throttle opening degree varied by the user or a pedal torque varied by the user.

The target speed gradient may correspond to the input acceleration command value. That is, the speed gradient of the motor may be varied such that the speed gradient is gentler than the target speed gradient corresponding to the input acceleration command value when the input acceleration command value is greater than the reference value.

The speed gradient of the motor may be varied such that the speed gradient is still further gentler than the target speed gradient when the input acceleration command value is still further greater than the reference value.

In accordance with another aspect of the present invention, a control method of an electric bicycle for driving the electric bicycle by rotating a motor using electrical energy accumulated in a battery includes receiving an acceleration command value input by a user to accelerate the electric bicycle upon starting the electric bicycle from a stopped state, comparing the input acceleration command value with a reference value, and increasing a time taken for a rotation speed of the motor to reach a target speed when the input acceleration command value is greater than the reference value.

The input acceleration command value may be determined based on a throttle opening degree varied by the user or a pedal torque varied by the user.

The time taken for the rotation speed of the motor to reach the target speed may be still further increased when the input acceleration command value is still further greater than the reference value.

The target speed may correspond to the input acceleration command value, and the time taken for the rotation speed of the motor to reach the target speed corresponding to the input acceleration command value may be still further increased when the input acceleration command value is still further greater than the reference value.

In accordance with another aspect of the present invention, an electric bicycle includes a generator to generate electric energy in accordance with rotation of pedals, a battery to accumulate the electric energy generated from the generator, a motor to be driven by the electric energy accumulated by the battery, a motor driver to drive the motor, an input unit to receive an acceleration command value input by a user, and an electronic control unit to compare the acceleration command value input through the input unit with a reference value when the electric bicycle starts from a stopped state, and to control the motor driver such that a time taken for a rotation speed of the motor to reach a target speed is increased when the input acceleration command value is greater than the reference value.

The input unit may include a throttle opening degree sensor to sense a throttle opening degree of a throttle provided at a handle of the electric bicycle or a pedal torque sensor to sense a pedal torque generated when the user pedals.

The electronic control unit may include a comparator to compare the input acceleration command value with the reference value, a sudden start determiner to determine, based on a result of the comparison, that sudden start will occur, when the input acceleration command value is greater than the reference value, and a sudden start preventer to output a motor control signal to increase the time taken for the rotation speed of the motor to reach the target speed when it is determined by the sudden start determiner that sudden start will occur.

The electronic control unit may control the motor driver such that the time taken for the rotation speed of the motor to reach the target speed is still further increased when the input acceleration command value is still further greater than the reference value.

In accordance with another aspect of the present invention, an electric bicycle includes a generator to generate electric energy in accordance with rotation of pedals, a battery to accumulate the electric energy generated from the generator, a motor to be driven by the electric energy accumulated by the battery, a motor driver to drive the motor, an input unit to receive an acceleration command value input by a user, and an electronic control unit to compare the acceleration command value input through the input unit with a reference value when the electric bicycle starts from a stopped state, and to control the motor driver such that a speed gradient of the motor is gentler than a target speed gradient.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
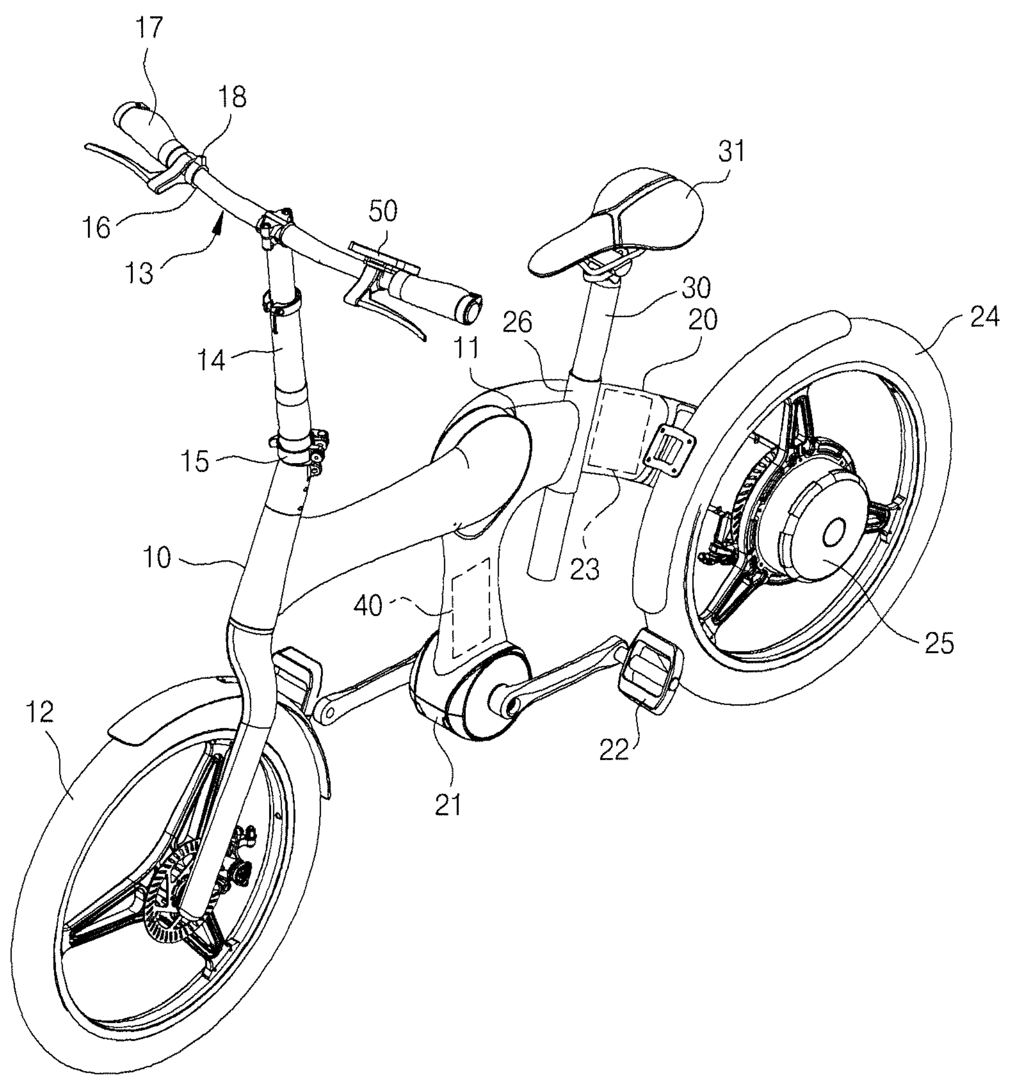
FIG. 1 is a perspective view illustrating an electric bicycle according to an exemplary embodiment of the present invention.

Reference will now be made in detail to the preferred embodiments of the present invention, examples of which are illustrated in the accompanying drawings. These embodiments are provided so that this disclosure will be thorough and complete, and will fully convey the spirit and scope of the present invention to those skilled in the art. Other embodiments may also be provided. Constituent elements other than elements constituting essential features of the present invention may be omitted from the drawings, for clarity of description. In the drawings, the widths, lengths, and thicknesses of constituent elements may be exaggerated for clarity and convenience of illustration. Like reference numerals refer to like elements throughout.

FIG. 1 is a perspective view illustrating an electric bicycle according to an exemplary embodiment of the present invention.

Referring to FIG. 1, the electric bicycle includes a front frame 10, a rear frame 20, and a saddle frame 30.

The front frame 10 and rear frame 20 are pivotally coupled to a hinge plate 11 by a hinge shaft. The hinge plate ills installed to be pivotable about the hinge shaft in forward and rearward directions.

A handle stay 14 is coupled to one end of the front frame 10. A front wheel 12 and a handle 13 are connected to the handle stay 14.

The handle 13 includes a handle stem 15 coupled to a lower end of the handle stay 14, a handle bar 16 coupled to the handle stay 14, and handle grips 17 respectively fitted around opposite ends of the handle bar 16. The handle 13 also includes a throttle 18 to receive an acceleration command input by the user.

The handle stem 15 is provided to adjust the level of the handle 13. The handle bar 16 is provided to steer the electric bicycle. An interface device 50 is provide at one of the handle grip 17, not only to display a state of the electric bicycle to the user, but also to transmit a command from the user to an electronic control unit 40, which will be described later. The interface device 50 is electrically connected to the electronic control unit 40. The throttle 18 may have the form of a lever operable by the user. When the user rotates the throttle 18, a signal representing a rotation degree of the throttle 18 is output from the throttle 18. Similarly to a general throttle, the throttle 18 may sense an opening degree of a throttle valve provided therein, and may then output a signal representing the sensed opening degree.

The front wheel 12 is rotatably coupled to the lower end of the handle stay 14 at one side of the handle stay 14. In accordance with an embodiment of the present invention, the front wheel 12 may be coupled to the lower end of the handle stay 14 at a right side of the handle stay 14 when viewed from a rear side of the electric bicycle. Alternatively, the handle stay 14 may have a fork shape, and the front wheel 12 may be mounted to the fork-shaped handle stay 14, as in a traditional bicycle.

A generator 21 is provided at one end of the rear frame 20. Pedals 22 are rotatably mounted to opposite sides of the generator 21. When the pedals 22 are rotated, rotating force is generated from the pedals 22, and is converted into electrical energy by the generator 21. The electrical energy from the generator 21 may be accumulated in a battery 23, which will be described later.

A rear wheel 24 is rotatably mounted to the other end of the rear frame 20 at a left side of the rear frame 20. Although not shown, the rear frame 20 may have a fork shape, and the rear frame 20 may be mounted to the fork-shaped rear frame 20, as in a traditional bicycle.

A motor 25 is mounted to the rear wheel 24, to rotate the rear wheel 24, and thus to forwardly move the bicycle. A speed changer may be mounted to the motor 25 in order to change a rotation speed of the rear wheel 24 in accordance with user operation of the interface device 50.

The battery 23, which accumulates electrical energy from the generator 21, may be mounted in the rear frame 20, together with the electronic control unit 40. The battery 23 may also be mounted in the front frame 10.

The rear frame 20 is coupled, at one side thereof, to a rear portion of a seat tube 26. The rear frame 20 and seat tube 26 may be integrated.

The saddle frame 30 is coupled to the rear frame 20. A saddle 31, on which the user will sit, is mounted to one end of the saddle frame 30.

Figure 2:
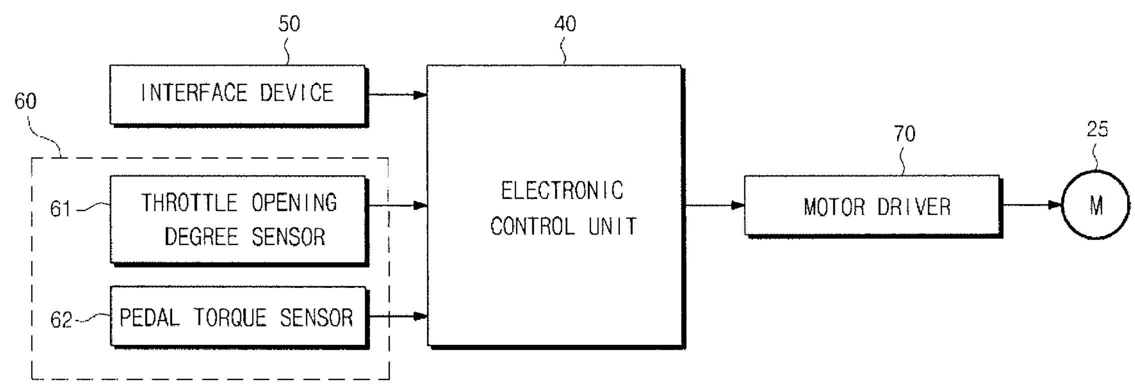
FIG. 2 is a block diagram illustrating a control configuration of the electric bicycle according to an embodiment of the present invention.

FIG. 2 is a block diagram illustrating a control configuration of the electric bicycle according to an embodiment of the present invention.

Referring to FIG. 2, the electric bicycle includes the electronic control unit 40, the interface device 50, an input unit 60, and a motor driver 70.

The interface device 50 not only displays a state of the electric bicycle to the user, but also transmits a command input by the user via the button to the electronic control unit 40.

The input unit 60 is adapted to receive an acceleration command input by the user. The input unit 60 includes a throttle opening degree sensor 61 and a pedal torque sensor 62.

The throttle opening degree sensor 61 senses a throttle opening degree of the throttle 18. When the user rotates the throttle 18, for acceleration, the throttle opening degree sensor 61 senses a throttle opening degree according to a rotation degree of the throttle 18. This throttle opening degree corresponds to an output from a motor.

The throttle opening degree sensor 61 may include a throttle position sensor provided within the throttle 18. The throttle position sensor is mounted to a throttle body of the throttle 18, to convert an opening degree of the throttle valve into an electrical signal. The signal representing the throttle opening degree sensed by the throttle opening degree sensor 61 is transmitted to the electronic control unit 40.

The pedal torque sensor 62 may include a torque sensor disposed on a pedal shaft of the rear frame 20. The torque sensor senses force to rotate the pedals 22, namely, a pedal torque. The signal representing the pedal torque sensed by the pedal torque sensor 62 is transmitted to the electronic control unit 40.

The motor driver 70 adjusts the rotation speed of the motor 25 by changing the number of poles of the motor 25 or varying the frequency of electric power supplied to the motor 25.

The electronic control unit 40 receives an acceleration command value input by the user, which corresponds to a throttle opening degree sensed by the throttle opening degree sensor 61 or an acceleration command value input by the user, which corresponds to a pedal torque sensed by the pedal torque sensor 62. The electronic control unit 40 then compares the input acceleration command value with a predetermined reference value. When it is estimated, based on the result of the comparison, that sudden start of the electric bicycle will occur, the electronic control unit 40 increases the time taken for the rotation speed of the motor 25 to reach a target speed. For example, the electronic control unit 40 reduces the speed gradient of the motor 25 to be gentler than the speed gradient corresponding to the target rotation speed. Since the speed gradient of the motor 25 becomes gentle in this case, the electric bicycle starts slowly.

Figure 3:
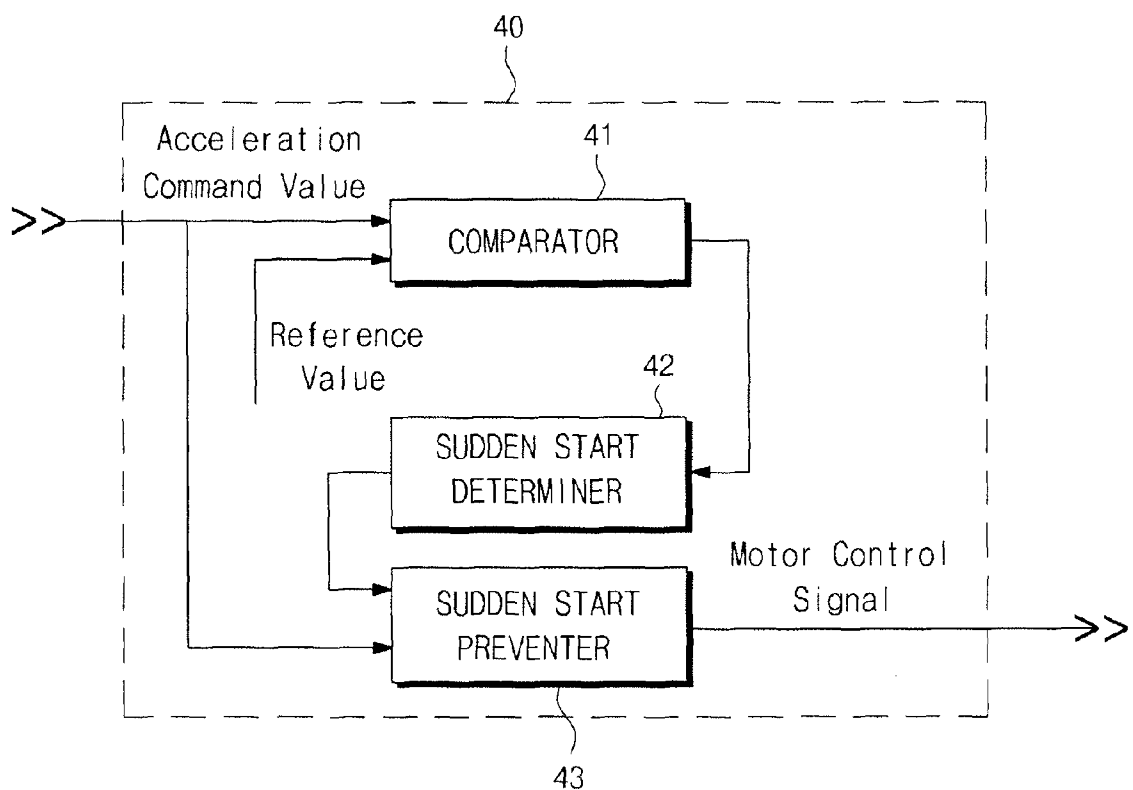
FIG. 3 is a block diagram schematically illustrating a configuration of the electronic control unit in the electric bicycle according to an embodiment of the present invention.

FIG. 3 is a block diagram schematically illustrating a configuration of the electronic control unit in the electric bicycle according to an embodiment of the present invention.

Referring to FIG. 3, the electronic control unit 40 includes a comparator 41, a sudden start determiner 42, and a sudden start preventer 43.

The comparator 41 compares an acceleration command value with a reference value, and transmits the result of the comparison to the sudden start determiner 42.

The sudden start determiner 42 determines sudden start or normal start, based on the comparison result transmitted form the comparator 41.

That is, when it is determined, based on the comparison result, that the acceleration command value is lower than the reference value, it is determined that the electric bicycle will normally start.

The sudden start preventer 43 adjusts the time taken for the rotation speed of the motor 25 to reach a target speed in accordance with the result of the determination executed by the sudden start determiner 42 and the acceleration command value input by the user.

That is, when it is determined, based on the determination result from the sudden start determiner 42, that sudden start will occur, the sudden start preventer 43 outputs a motor control signal to increase the time taken for the rotation speed of the motor 25 to reach a target speed corresponding to the acceleration command value such that the time is greater than a reference time corresponding to the acceleration command value. In accordance with the motor control signal, the speed gradient of the motor 25 becomes gentler than a target speed gradient. As a result, the electric bicycle will start slowly without sudden start.

On the other hand, when it is determined, based on the determination result from the sudden start determiner 42, that normal start will occur, the sudden start preventer 43 outputs a motor control signal to fix the time taken for the rotation speed of the motor 25 to reach the target speed corresponding to the acceleration command value such that the time is equal to the reference time corresponding to the acceleration command value.

Figure 4:
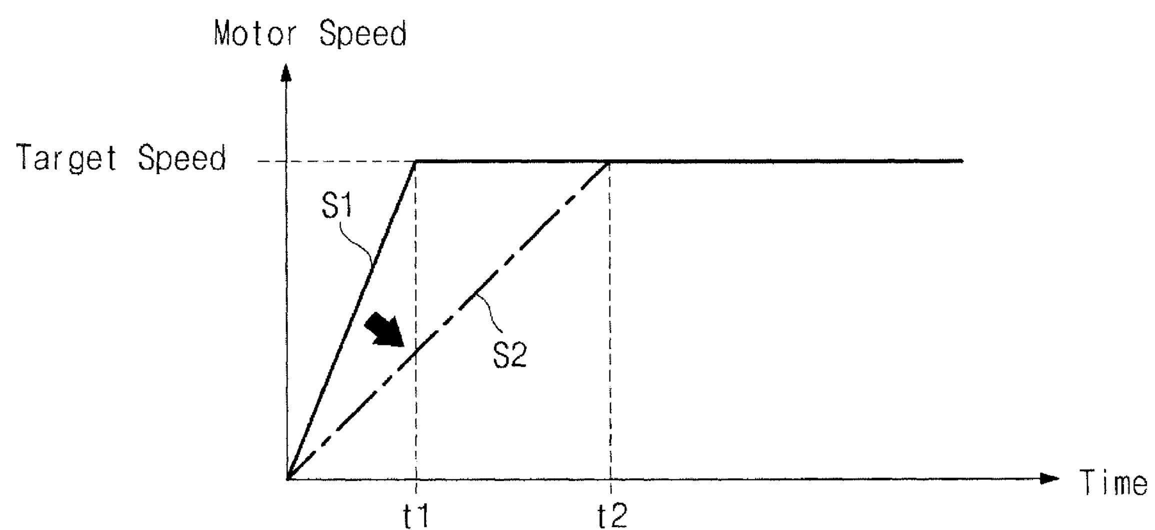
FIG. 4 is a graph explaining variation in time taken for the rotation speed of the motor to reach a target speed, for prevention of sudden start in the electric bicycle according to the illustrated embodiment of the present invention.

FIG. 4 is a graph explaining variation in time taken for the rotation speed of the motor to reach a target speed, for prevention of sudden start in the electric bicycle according to the illustrated embodiment of the present invention.

Referring to FIG. 4, the horizontal axis in the graph represents time, and the vertical axis in the graph represents motor speed.

The motor speed gradient S1 in the graph represents a gradient along which the rotation speed of the motor 25 reaches a target speed Vt corresponding to an acceleration command value input by the user within a reference time t1.

The motor speed gradient S2 in the graph represents a gradient along which the rotation speed of the motor 25 reaches the target speed Vt corresponding to the acceleration command value input by the user within a reference time t2 longer than the reference time t1.

When it is estimated that sudden start will occur upon starting the electric bicycle from a stopped state thereof, the motor speed gradient is varied from S1 to S2, to prevent sudden start of the electric bicycle.

The following description will be given of the electric bicycle according to the illustrated embodiment of the present invention in conjunction with, for example, the case in which the user rotates the throttle, to input a throttle opening degree as an acceleration command.

Figure 5:
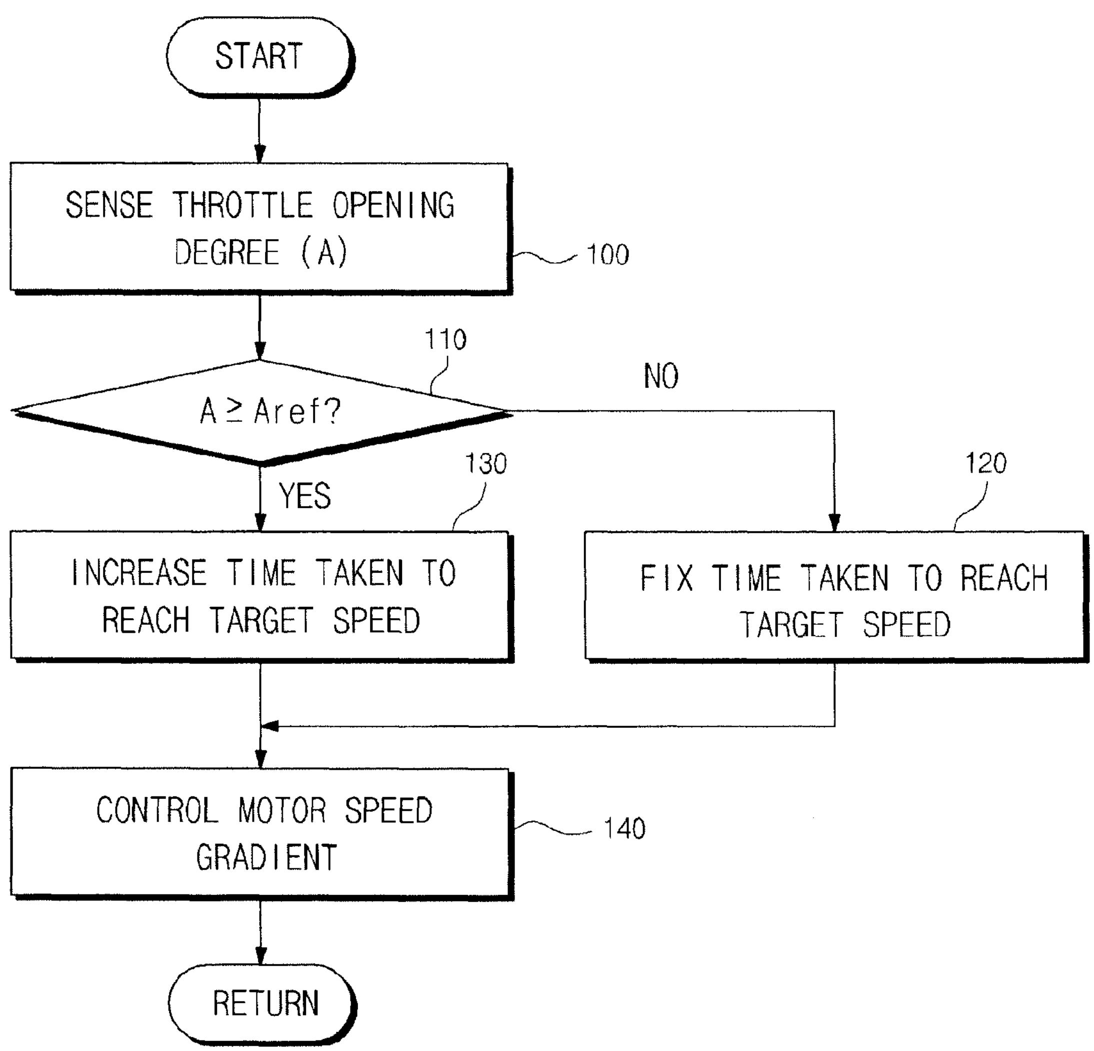
FIG. 5 is a flowchart explaining prevention of sudden start upon starting the electric bicycle from a stopped state thereof in accordance with the illustrated embodiment of the present invention.

FIG. 5 is a flowchart explaining prevention of sudden start upon starting the electric bicycle from a stopped state thereof in accordance with the illustrated embodiment of the present invention.

Referring to FIG. 5, the electronic control unit 40 senses a throttle opening degree through the throttle opening degree sensor 61 (100).

After sensing the throttle opening degree, the electronic control unit 40 compares the sensed throttle opening degree A with a predetermined value Aref, to determine whether the throttle opening degree A is greater than the predetermined value Aref.

When it is determined, based on the result of the determination executed in the operation 110, that the sensed throttle opening degree A is smaller than the predetermined value Aref, it is determined that the electric bicycle will normally start without sudden start. In this case, accordingly, the time t1 taken for the rotation speed of the motor 25 to reach a target speed corresponding to the sensed throttle opening degree A is fixed (120). Then, the motor rotation gradient is controlled such that the rotation speed of the motor 25 reaches the target speed corresponding to the throttle opening degree A within the time t1 (140).

On the other hand, when it is determined, based on the result of the determination executed in the operation 110, that the sensed throttle opening degree A is equal to or greater than the predetermined value Aref, it is determined that the electric bicycle will suddenly start. In this case, accordingly, the time taken for the rotation speed of the motor 25 to reach a target speed corresponding to the sensed throttle opening degree A is varied from t1 to t2 (130). Then, the motor rotation gradient is controlled such that the rotation speed of the motor 25 reaches the target speed corresponding to the throttle opening degree A within the time t2 (140). As a result, the electric bicycle will slowly start without sudden start because the speed gradient of the motor 25 is varied from S1 to S2, to be gentle.

As apparent from the above description, in accordance with an aspect of the present invention, when the user excessively quickly accelerates the electric bicycle upon starting the electric bicycle from a stopped state, it may be possible to prevent sudden start by varying the time for the rotation speed of the motor to reach a target speed. Accordingly, it may be possible to obtain enhanced ride sensation. Also, safety against sudden start may be ensured.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A control method of an electric bicycle for driving the electric bicycle by rotating a motor using electrical energy accumulated in a battery, comprising:

receiving an acceleration command value input by a user to accelerate the electric bicycle upon starting the electric bicycle from a stopped state;

comparing the input acceleration command value with a reference value;

determining sudden start or normal start based on a result of the comparison, the normal start being determined if the input acceleration command value is lower than the reference value;

outputting a motor control signal depending on whether the sudden or the normal start is determined, a time taken for rotation speed of the motor to reach a target speed corresponding to the acceleration command value being fixed by the motor control signal such that the time is equal to a reference time if the normal start is determined while the time is greater than the reference time if the sudden start is determined such that a speed gradient of the motor is reduced when the input acceleration command value is greater than the reference value; and sensing a throttle opening degree varied by the user and a pedal torque to rotate pedals varied by the user, wherein the input acceleration command value is determined based on the throttle opening degree or the pedal torque.

2. The control method according to claim 1, wherein the time taken for the rotation speed of the motor to reach the target speed is still further increased when the input acceleration command value is still further greater than the reference value.

3. The control method according to claim 1, wherein the target speed corresponds to the input acceleration command value, and the time taken for the rotation speed of the motor to reach the target speed corresponding to the input acceleration command value is still further increased when the input acceleration command value is still further greater than the reference value.

4. An electric bicycle comprising:

a generator to generate electric energy in accordance with rotation of pedals;

a battery to accumulate the electric energy generated from the generator;

a motor to be driven by the electric energy accumulated by the battery;

a motor driver to drive the motor;

an input unit to receive an acceleration command value input by a user; and an electronic control unit to compare the acceleration command value input through the input unit with a reference value when the electric bicycle starts from a stopped state, and to control the motor driver such that a time taken for a rotation speed of the motor to reach a target speed is increased when the input acceleration command value is greater than the reference value, wherein the input unit comprises:

a throttle opening degree sensor to sense a throttle opening degree of a throttle provided at a handle of the electric bicycle and a pedal torque sensor to sense a pedal torque to rotate pedals generated when the user pedals;

a comparator to compare the input acceleration command value with the reference value;

a sudden start determiner to determine, based on a result of the comparison, whether sudden start or normal start will occur, the sudden start being determined if the input acceleration command value is greater than the reference value and the normal start being determined if the input acceleration command value is lower than the reference value; and a sudden start preventer to output a motor control signal to the motor driver depending on whether the sudden or normal start is determined by the sudden start determiner, the sudden start preventer being configured to fix the time taken for the rotation speed of the motor to reach the target speed such that the time is equal to a reference time if the normal start is determined while the time is greater than the reference time if the sudden start is determined such that a speed gradient of the motor is reduced when the input acceleration command value is greater than the reference value.

5. The electric bicycle according to claim 4, wherein the electronic control unit controls the motor driver such that the time taken for the rotation speed of the motor to reach the target speed is still further increased when the input acceleration command value is still further greater than the reference value.

* * * * *